(12) United States Patent
Liao et al.

(10) Patent No.: US 12,289,037 B2
(45) Date of Patent: Apr. 29, 2025

(54) BIOKINETIC ENERGY COLLECTION APPARATUS AND FABRICATION METHOD THEREOF

(71) Applicant: The Chinese University of Hong Kong, Hong Kong (CN)

(72) Inventors: Wei-Hsin Liao, Hong Kong (CN); Mingjing Cai, Zhanjiang (CN)

(73) Assignee: The Chinese University of Hong Kong, Hong Kong (CN)

( * ) Notice: Subject to any disclaimer, the term of this patent is extended or adjusted under 35 U.S.C. 154(b) by 336 days.

(21) Appl. No.: 17/944,286

(22) Filed: Sep. 14, 2022

(65) Prior Publication Data

US 2023/0093955 A1 Mar. 30, 2023

(30) Foreign Application Priority Data

Sep. 24, 2021 (CN) .......................... 202111120926.0

(51) Int. Cl.
*H02K 7/18* (2006.01)
*F03G 7/08* (2006.01)
*H02K 7/116* (2006.01)

(52) U.S. Cl.
CPC ............. *H02K 7/1853* (2013.01); *F03G 7/08* (2013.01); *H02K 7/116* (2013.01)

(58) Field of Classification Search
CPC ......... H02K 7/1853; H02K 7/116; F03G 7/08
See application file for complete search history.

(56) References Cited

U.S. PATENT DOCUMENTS

2013/0127268 A1* 5/2013 Atherton ................... G01P 3/22
310/46
2015/0162803 A1* 6/2015 Stanton ..................... F03G 5/06
290/1 C
2018/0041097 A1* 2/2018 Kanahama ............... H02K 7/04
(Continued)

FOREIGN PATENT DOCUMENTS

CN 204965023 U 1/2016
CN 111525768 A 8/2020
(Continued)

OTHER PUBLICATIONS

International Search Report in International Appln. No. PCT/CN2022/120715, mailed on Nov. 10, 2022, 4 pages.

*Primary Examiner* — Forrest M Phillips
(74) *Attorney, Agent, or Firm* — Fish & Richardson P.C.

(57) ABSTRACT

A biokinetic energy collection apparatus and a fabrication method thereof are provided. The apparatus includes: a counter weight, configured to oscillate with a movement of a wearer, to convert a mechanical energy generated by the movement into kinetic energy of the counter weight; a rotating frame, mechanically coupled to the counter weight, and configured to receive the kinetic energy from the counter weight; a planetary gear train, mechanically coupled to the rotating frame, to rotate as the rotating frame moves; and a stator assembly and a rotor assembly, coupled to each other, where the stator assembly includes a coil, the rotor assembly includes a rotor and a third permanent magnet located on the rotor, and the rotor is mechanically coupled to the planetary gear train and receives the kinetic energy from the planetary gear train, to cause the third permanent magnet to rotate with the rotor.

18 Claims, 3 Drawing Sheets

(56) References Cited

U.S. PATENT DOCUMENTS

2019/0157960 A1* 5/2019 Ohishi .................. H02K 35/02
2020/0072319 A1* 3/2020 Sharpes .................. H02N 2/18
2020/0251962 A1* 8/2020 Liao ...................... H02K 21/22

FOREIGN PATENT DOCUMENTS

| JP | 2000032724 A | * | 1/2000 | | |
| JP | 2003032986 A | | 1/2003 | | |
| KR | 101720454 B1 | | 4/2017 | | |
| WO | WO-2018196551 A1 | * | 11/2018 | ............. | H02K 35/02 |

* cited by examiner

BIOKINETIC ENERGY COLLECTION APPARATUS AND FABRICATION METHOD THEREOF

CROSS-REFERENCE TO RELATED APPLICATIONS

The present application claims the priority of Chinese Patent Application No. 202111120926.0, titled "BIOKINETIC ENERGY COLLECTION APPARATUS AND FABRICATION METHOD THEREOF", filed on Sep. 24, 2021, the content of which is incorporated herein by reference in its entirety.

TECHNICAL FIELD

The present disclosure relates to the fields of energy capture and energy reuse, and specifically to a wearable biokinetic energy collection apparatus and a fabrication method thereof.

BACKGROUND

With the development of society, various portable and wearable electronic devices are emerging, for example, smart watches, smart bracelets, wireless earphones, virtual reality glasses, and wearable health monitoring devices. These devices are mainly dependent on the power of batteries. However, due to the limitations of the existing technology, the battery capacity is limited, resulting in a short battery life and frequent charging. At the same time, an existing apparatus that generates electricity using an inertia wheel is thick and has a large size. Moreover, the structure of the apparatus is not compact enough and the power generation performance of the apparatus is low. Therefore, it is difficult to embed the apparatus into the wearable electronic devices to meet the power supply requirement. Therefore, it is necessary and meaningful to find a new thin power supply that can be embedded in the wearable electronic devices to supply power to the electronic devices, reducing the dependence on the batteries and improving the user experience.

SUMMARY

The embodiments proposed in the present disclosure can solve or partially solve the deficiencies mentioned in the Background or other deficiencies in the existing technology.

In an aspect of the disclosure, an apparatus adapted to collect a kinetic energy from a wearable object is provided, which includes: a counter weight, configured to oscillate with a movement of a wearer, to convert a mechanical energy generated by the movement into a kinetic energy of the counter weight; a rotating frame, mechanically coupled to the counter weight, and configured to receive the kinetic energy from the counter weight; a planetary gear train, mechanically coupled to the rotating frame, to rotate as the rotating frame moves; and a stator assembly and a rotor assembly, coupled to each other, where the stator assembly comprises a coil, and the rotor assembly comprises a rotor and a third permanent magnet located on the rotor, where the rotor is mechanically coupled to the planetary gear train and receives the kinetic energy from the planetary gear train, to cause the third permanent magnet to rotate with the rotor, to change a magnetic flux of the coil to generate an induced electromotive force.

In an embodiment, the apparatus further includes: a base; and a magnetic spring assembly including: a first permanent magnet, fixed onto the base, and a second permanent magnet, fixed onto the rotating frame, where a polarity of the first permanent magnet is repulsive to a polarity of the second permanent magnet.

In an embodiment, a number of pairs of poles of the third permanent magnet is a multiple of a number of pairs of poles of the first permanent magnet, and the number of the pairs of poles of the third permanent magnet is a multiple of a number of pairs of poles of the second permanent magnet.

In an embodiment, the planetary gear train includes a ring gear, mechanically coupled to a cambered surface on a side of the rotating frame close to the rotor; a planetary gear, engaged with the ring gear; and a sun gear, engaged with the planetary gear and having a concentric shaft with the rotor.

In an embodiment, the rotating frame includes: a rotating frame cylinder ring; and a rotating frame cylinder, bonded to the rotating frame cylinder ring seamlessly, where there is at least one of a through hole or a recess in a first region of the rotating frame cylinder, where a projection shape of the first region on a side of the rotating frame cylinder close to the rotor is semicircular.

In an embodiment, a weighting block is arranged in a second region of the rotating frame different from the first region.

In an embodiment, the second region is located on a side of a first semicircular ring of the rotating frame cylinder ring close to the rotor, and the counter weight is located on a side of the first semicircular ring of the rotating frame cylinder ring away from the rotor.

In an embodiment, the counter weight is constituted by bonding a first partial cylinder ring and a second partial cylinder ring seamlessly, and mass of the second partial cylinder ring is greater than mass of the first partial cylinder ring.

In an embodiment, a first cambered surface of the first partial cylinder ring and a first cambered surface of the second partial cylinder ring are located on a given cambered surface, and a second cambered surface of the first partial cylinder ring is at least partially bonded to a cambered surface on a side of the rotating frame cylinder ring away from the rotor, and a side of the first partial cylinder ring away from the base is coplanar with a side of the rotating frame away from the base, and a side of the second partial cylinder ring away from the rotating frame is coplanar with a side of the base away from the rotating frame.

In an embodiment, projections of the first partial cylinder ring and the second partial cylinder ring on a plane on a side of the rotating frame away from the rotor are concentric, and central angles of the projections are identical, the central angles being less than 180°.

In an embodiment, the stator assembly further includes a stator, and the coil is wound around a surface of the stator.

In an embodiment, the counter weight, the magnetic spring assembly, the planetary gear train, the rotor assembly, the stator assembly and the base are coaxially disposed.

In an embodiment, the base has at least one of a through hole or a recess, for placement of the coil.

In an embodiment, the rotor assembly is located between the planetary gear train and the base, and the stator assembly is located between the rotor assembly and the base.

In another aspect of the disclosure, a method for fabricating a kinetic energy collection apparatus is provided, which includes: coupling a counter weight to a rotating frame mechanically, the counter weight being configured to oscillate with a movement of a wearing object, to convert a mechanical energy generated by the movement into a kinetic energy of the counter weight; coupling the rotating frame to a planetary gear train mechanically, to cause the planetary gear train to rotate as the rotating frame moves; and disposing a stator assembly and a rotor assembly that are coupled to each other, where the stator assembly includes a coil, and the rotor assembly includes a rotor and a third permanent magnet located on the rotor, where the rotor is mechanically coupled to the planetary gear train and receives the kinetic energy from the planetary gear train, to cause the third permanent magnet to rotate with the rotor, to change a magnetic flux of the coil to generate an induced electromotive force.

In an embodiment, the method further includes: fixing a first permanent magnet of a magnetic spring assembly onto a base, and fixing a second permanent magnet of the magnetic spring assembly onto the rotating frame, where a polarity of the first permanent magnet is repulsive to a polarity of the second permanent magnet, to reduce a potential well depth of the counter weight, thereby enhancing the kinetic energy received by the rotating frame from the counter weight.

In an embodiment, the method further includes: disposing a ring gear on a cambered surface on a side of the rotating frame close to the rotor; disposing a planetary gear in a semicircular structure formed by connecting the rotating frame and the counter weight, the planetary gear being engaged with the ring gear; and disposing a sun gear, engaged with the planetary gear and having a concentric shaft with the rotor.

In an embodiment, the method further includes: forming at least one of a through hole or a recess in a first region of a rotating frame cylinder, where the rotating frame is constituted by bonding a rotating frame cylinder ring and the rotating frame cylinder seamlessly, and a projection shape of the first region on a side of the rotating frame cylinder close to the rotor is semicircular.

In an embodiment, the method further includes: forming a weighting block in a second region of the rotating frame, where the second region is a region of the rotating frame cylinder other than the first region.

In an embodiment, disposing the stator assembly includes displaying a stator and winding a coil around a surface of the stator.

In yet another aspect of the disclosure, an electronic device is provided, which includes a biokinetic energy collection apparatus according any embodiment.

The kinetic energy collection apparatus and the fabrication method thereof provided according to the present disclosure can have at least one of the following advantages:

1) the kinetic energy collection apparatus provided in the present disclosure can convert the mechanical energy generated by the biological movement into the electrical energy, and at the same time, can use the magnetic spring to enhance the kinetic energy collection efficiency, and the magnetic spring does not increase friction and interfere with power generation; and 2) the kinetic energy collection apparatus provided in the present disclosure has a compact structure, a small size and a light weight, high power and a high energy density, and thus can be embedded in the wearable electronic devices.

BRIEF DESCRIPTION OF THE DRAWINGS

In combination with the accompanying drawings, other features, objectives and advantages of the present disclosure will be more apparent through the following detailed descriptions for non-limiting embodiments. In the accompanying drawings.

DETAILED DESCRIPTION OF EMBODIMENTS

Figure 1:
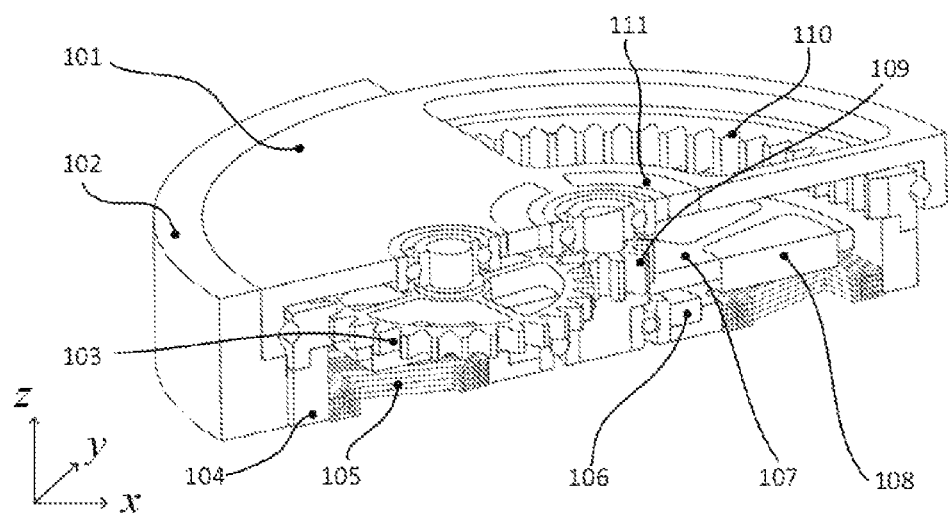
FIG. 1 is a schematic half-section structure diagram of a kinetic energy collection apparatus according to an embodiment of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as first, second and third are only used to distinguish one feature from another, rather than represent any limitations to the features, especially any sequential order. Thus, the first permanent magnet discussed in the present disclosure may alternatively be referred to as the second permanent magnet without departing from the teachings of the present disclosure, and vice versa.

In the accompanying drawings, the thicknesses, sizes and shapes of the components are slightly adjusted for the convenience of explanation. The accompanying drawings are merely illustrative and not strictly drawn to scale. For example, in the present disclosure, the thickness of the first permanent magnet drawn in the accompanying drawings is not drawn to the scale in the actual production. As used herein, the terms "approximately" and "about" and similar terms are used as terms of approximation and not as terms of degree, and are intended to account for the inherent deviations in measured or calculated values that will be recognized by those of ordinary skill in the art.

It should be further understood that the expressions such as "comprise," "comprising," "having," "include" and/or "including" in the specification are open-ended expressions rather than close-ended expressions, which specify the presence of stated features, elements and/or components, but do not exclude the presence of one or more other features, elements, components and/or combinations thereof. In addition, the expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including engineering terms and scientific and technical terms) used herein have the same meaning as commonly understood by those of ordinary skill in the art to which the present disclosure belongs. It should be further understood that the terms defined in commonly used dictionaries should be interpreted as having a meaning that is consistent with their meaning in the context of the relevant art and will not be interpreted in an idealized or overly formal sense unless expressly so defined in the present disclosure.

It should be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure are described below in detail.

A kinetic energy collection apparatus 100 may have an auxiliary tool (not shown) adapted to be worn by a wearer, for example, a strap or other appropriate securing apparatus adapted to bind the kinetic energy collection apparatus 100 to any of the limbs of a wearer. The kinetic energy collection apparatus 100 may alternatively be embedded in or arranged in a smart watch or another apparatus requiring a power supply, which is self-powered by the energy collected by the kinetic energy collection apparatus 100 from the wearer.

Figure 2:
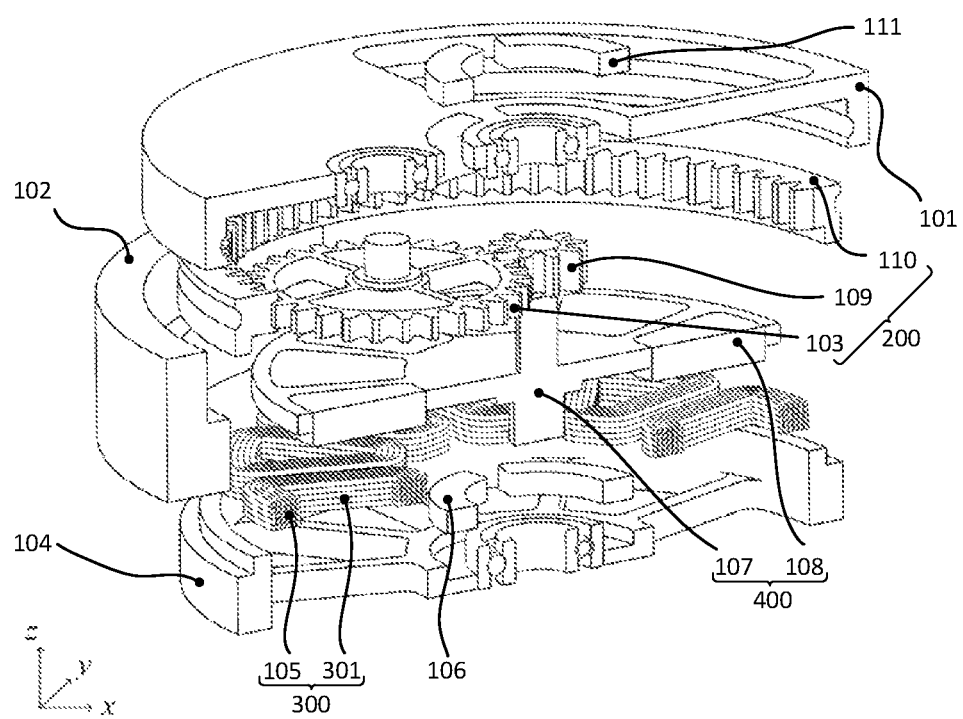
FIG. 2 is a schematic half-section explosion structure diagram of a kinetic energy collection apparatus according to an embodiment of the present disclosure.

FIG. 1 is a schematic structural diagram of a kinetic energy collection apparatus according to an embodiment of the present disclosure, and FIG. 2 is a schematic half-section explosion structure diagram of a kinetic energy collection apparatus 100 according to an embodiment of the present disclosure. For the convenience of observation, the components in FIG. 1 are moved only in a z direction, forming the diagram shown in FIG. 2. As shown in FIGS. 1 and 2, the kinetic energy collection apparatus 100 includes a rotating frame 101, a counter weight 102, a planetary gear train 200, and a stator assembly 300 and a rotor assembly 400 coupled to the stator assembly 300.

The rotating frame 101 may be composed of a cylinder ring and a cylinder. In an embodiment, the outer side wall of the rotating frame 101 may be the outer side wall of the cylinder ring, the outer side wall being disposed to be mechanically coupled to the inner wall of the ring body of the counter weight 102. The inner side wall of the rotating frame 101 is the inner side wall of the cylinder ring, and a ring gear 110 mechanically coupled to the inner side wall is disposed on the inner side wall.

The counter weight 102 may be, for example, a ring body having a central angle less than 180° and having eccentric mass. Although it is shown in the drawings that the counter weight 102 has the shape of the ring body, other appropriate shapes are also applicable. In addition, the counter weight 102 may be made of a high-density material to improve the energy collection capability, for example, may be made of a tungsten alloy, or a copper alloy. When the kinetic energy collection apparatus 100 is worn through the above auxiliary tool (not shown) on a limb of the wearer or disposed on an other device worn on the limb of the user, the counter weight 102 oscillates as the limb moves, thereby generating corresponding kinetic energy.

The planetary gear train 200 is mechanically coupled to the inner side of the ring body of the counter weight 102, and has the ring gear 110, a rotor 107, a planetary gear 103, and a sun gear 109. The sun gear 109 is coaxially connected with the rotor 107. The planetary gear 103 is respectively engaged with the sun gear 109 and the ring gear 110, and is located at a side close to the counter weight 102. Specifically, during the movement of the wearer, the counter weight 102 obtains the kinetic energy of the wearer and brings about the rotation of the rotating frame 101. During the rotation, the ring gear 110 mechanically coupled to the inner cambered surface of the rotating frame 101 rotates along with the rotating frame 101, and brings about the rotation of the planetary gear 103, thereby bringing about the movement of the sun gear 109 and the rotor 107 coaxially connected with the sun gear 109. The stator assembly 300 and the rotor assembly 400 that are coupled to each other produce an electromotive force according to the energy collected by the planetary gear train 200 from the counter weight 102. As shown in FIG. 2, the stator assembly 300 is located in a recess or a through hole of a base 104, and includes a stator 301 and a coil 105 wound around the stator 301. The rotor assembly 400 is connected coaxially with the sun gear 109, and is coaxial with the base 104. As shown in the figure, the rotor assembly 400 includes a semicircular rotor 107 and a third permanent magnet 108 covering the edge and semicircular surface of the rotor 107. After the counter weight 102 transmits the kinetic energy of the wearer to the sun gear 109, the rotor 107 coaxially connected with the sun gear 109 also moves and causes the third permanent magnet 108 to rotate about an axis. The movement of the third permanent magnet 108 causes the magnetic flux of the coil 105 to change, thereby generating an induced electromotive force, which converts the kinetic energy into electrical energy.

In some embodiments, the kinetic energy collection apparatus 100 has the base 104 and a magnetic spring assembly 500. Specifically, the magnetic spring assembly 500 includes a first permanent magnet 106 fixed onto the base 104 and a second permanent magnet 111 fixed onto the rotating frame 101. In an embodiment, the polarity of the first permanent magnet 106 is repulsive to the polarity of the second permanent magnet 111. In some embodiments, the number of pairs of poles of the third permanent magnet 108 is a multiple of the number of pairs of poles of the first permanent magnet 106 and a multiple of the number of pairs of poles of the second permanent magnet 111 respectively. The first permanent magnet 106 is fixed onto the base 104, and may be composed of multiple pairs of permanent magnets of which the number is equal to that of the pairs of poles of the first permanent magnet 106, and uniformly arranged around the central axis of the base 104. In an alternative embodiment, a magnetic ring having pairs of poles of which the number is equal to that of the pairs of poles of the first permanent magnet 106 may alternatively be used. The first permanent magnet 106 may be magnetized radially, axially, or parallelly, or may be magnetized by using a Halbach array, to concentrate a magnetic field on one side of the second permanent magnet 111.

The second permanent magnet 111 is fixed to the rotating frame 101, and may be composed of multiple pairs of permanent magnets and uniformly arranged around the central axis of the rotating frame 101, or may be a magnetic ring having multiple pairs of poles. The second permanent magnet 111 may be magnetized radially, axially, or parallelly, or may be magnetized by using a Halbach array, to concentrate a magnetic field on one side of the first permanent magnet 106. However, the direction of magnetizing the second permanent magnet 111 is opposite to the direction of magnetizing the first permanent magnet 106, such that the polarity of the second permanent magnet 111 is repulsive to the polarity of the first permanent magnet 106.

Figure 3:
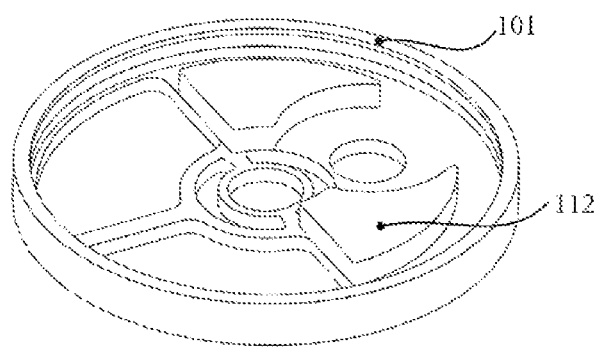
FIG. 3 is a schematic diagram of a rotating frame according to an embodiment of the present disclosure.

In some embodiments, the rotating frame 101 can rotate about the ring gear 110 freely. A portion of the rotating frame 101, which is not connected to the counter weight 102, may be partially removed by a process such as hollowing, hole digging, and settling, to achieve an asymmetric structure, thereby improving the overall eccentric mass and the energy collection capability. Meanwhile, the rotating frame 101 and the counter weight 102 may be connected by means of adhesive bonding, welding, a mechanical connection, etc. The material of the counter weight 102 may be selected to be the same as or different from that of the rotating frame 101, thereby further improving the overall eccentric mass and the energy collection capability. In some embodiments, the rotating frame 101 is constituted by bonding a rotating frame cylinder 101*a* and a rotating frame cylinder ring 101*b* seamlessly. There is at least one of a through hole or a recess in a first region of the rotating frame cylinder 101*a*. Here, the first region is located at a side of the rotating frame cylinder 101*a* close to the rotor 107, and has a semicircular shape. In some embodiments, a weighting block 112 (as shown in FIG. 3) is arranged in a second region of the rotating frame 101, and the second region is a portion of the rotating frame 101 different from the first region. In other words, the second region is located at a side of the rotating frame cylinder 101*a* away from the rotor 107, and together with the first region constitutes the circular plane of the rotating frame cylinder 101*a*. Further, the second region is located at a side of a first semicircular ring of the rotating frame cylinder ring 101*b* close to the rotor 107, and meanwhile, the counter weight 102 is mechanically coupled to a side of the first semicircular ring of the rotating frame cylinder ring 101*b* away from the rotor 107. The counter weight 102 is constituted by bonding a first partial cylinder ring 102*a* and a second partial cylinder ring 102*b* seamlessly. The mass of the second partial cylinder ring 102*b* may be greater then the mass of the first partial cylinder ring 102*a*. The counter weight 102 may be fixed to the outer cylindrical surface of the rotating frame 101, or may be fixed onto the bottom plane of the rotating frame 101.

In some embodiments, the first partial cylinder ring 102*a* and the second partial cylinder ring 102*b* are concentric, and the central angles of the projections of the first partial cylinder ring 102*a* and the second partial cylinder ring 102*b* on the plane formed by x axis and y axis are less than 180°. In other words, each of the first partial cylinder ring 102*a* and the second partial cylinder ring 102*b* is smaller than a half of a complete ring.

In some embodiments, the stator assembly 300 includes the stator 301 and the coil 105 wound around the surface of the stator 301. Here, the coil 105 is made by winding a self-adhesive coil, and may be wound on the iron core of the axial stator 301. Further, the coil 105 may alternatively be made by a printed circuit or a three-dimensional printing approach. The stator assembly 300 is located in the through hole or recess of the base 104. The rotating frame 101, the sun gear 109 and the rotor 107 are sequentially coaxially disposed on the base 104 from top to bottom. In some embodiments, the third permanent magnet 108 may be magnetized axially, or may be magnetized by using a Halbach array, to concentrate a magnetic field on one side of the coil 105 to enhance the power generation capability. In an embodiment, a surface of the third permanent magnet 108 at a side opposite to a side of the coil 105 may be covered with a high permeability material, for example, a silicon steel, or a permalloy, to enhance the power generation capability. The number of pairs of poles of the third permanent magnet 108 is a multiple of the number of pairs of poles of the first permanent magnet 106 and a multiple of the number of pairs of poles of the second permanent magnet 111.

Another aspect of the present disclosure further provides a method for fabricating a kinetic energy collection apparatus. Any apparatus in the above embodiments may be fabricated by the method. In some embodiments, as shown in FIGS. 1 and 2, the counter weight 102 is mechanically coupled to the rotating frame 101, and the rotating frame 101 may bring about the movement of the planetary gear train 200. Here, the counter weight 102 is configured to oscillate with a movement of the wearer, to convert the mechanical energy generated by the movement into the kinetic energy of the counter weight 102. The planetary gear train 200 moves along with the rotating frame 101 mechanically coupled to the counter weight, and receives the kinetic energy transmitted by the counter weight 102. The stator assembly 300 and the rotor assembly 400 that are coupled to each other are disposed. Here, the stator assembly 300 includes the coil 105, and the rotor assembly 400 includes the rotor 107 and the third permanent magnet 108 located on the rotor 107. The rotor 107 is mechanically coupled to the rotating frame 101 to receive the kinetic energy of the counter weight 102, to cause the third permanent magnet to rotate with the rotor 107, and the induced electromotive force is generated by changing the magnetic flux of the coil 105.

In some embodiments, the method of fabricating a kinetic energy collection apparatus further includes: disposing the ring gear 110 on a cambered surface at a side of the rotating frame 101 close to the rotor 107; and disposing, in a semicircular structure formed by connecting the rotating frame 101 and the counter weight 102, the planetary gear 103 engaged with the ring gear 110 and the sun gear 109 engaged with the planetary gear 103.

Since the content and structure of the kinetic energy collection apparatus described above may be completely or partially applied to the fabricating method described herein, the related or similar content will not be repeatedly described.

Figure 4:
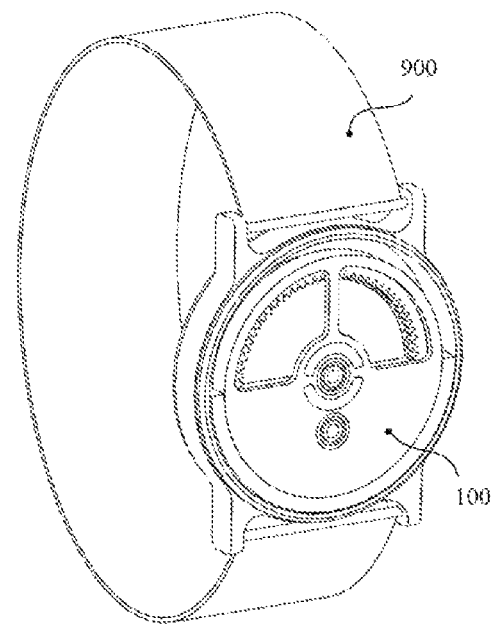
FIG. 4 is a schematic diagram of a kinetic energy collection apparatus embedded in an electronic device, according to an embodiment of the present disclosure.

Another aspect of the present disclosure further provides an electronic device, including the kinetic energy collection apparatus 100. As shown in FIG. 4, the kinetic energy collection apparatus 100 of the present disclosure can be embedded in, for example, a smart watch 900. By using the above technical solution, the kinetic energy collection apparatus 100 can efficiently utilize the limited space of the smart watch. When the user normally swings a limb, the counter weight oscillates around the central axis of the base 104 in the vicinity of the minimum potential energy point, due to the coaction of the inertial force and the gravity. Furthermore, the polarity of the first permanent magnet 106 of the magnetic spring is repulsive to the polarity of the second permanent magnet 111 of the magnetic spring, thus generating a repulsive moment. Accordingly, the counter weight 102 has a tendency to be far away from the minimum potential energy point, thereby increasing the amplitude of oscillation of the counter weight 102, and thus the counter weight 102 obtains more biological kinetic energy. Meanwhile, when the rotating frame 101 adopts an asymmetric structure, the biological kinetic energy obtained by the counter weight 102 can be further increased. The rotating frame 101 connected with the counter weight 102 drives the sun gear 109 and the rotor 107 to rotate through the planetary gear 103 of the planetary gear train, such that the rotor 107 obtains a rotation speed higher than that of the counter weight 102. When the rotor 107 rotates at a high speed, the third permanent magnet 108 on the rotor makes the coil 105 on the stator change in magnetic flux, thereby producing the induced electromotive force and converting the mechanical kinetic energy into the electrical energy, and thus power can be supplied to the smart watch.

The above description is only embodiments of the disclosure and the description of the applied technical principles. Those skilled in the art should understand that the scope of the disclosure is not limited to the technical scheme formed by the specific combination of the above technical features, but also covers other technical schemes formed by the arbitrary combination of the above technical features or their equivalent features without departing from the technical concept. For example, the technical solution formed by replacing the above features with (but not limited to) the technical features with similar functions disclosed in the disclosure.

What is claimed is:

1. An apparatus adapted to collect a kinetic energy from a wearable object, comprising:
    a counter weight, configured to oscillate with a movement of a wearer, to convert a mechanical energy generated by the movement into a kinetic energy of the counter weight;
    a rotating frame, mechanically coupled to the counter weight, and configured to receive the kinetic energy from the counter weight;
    a planetary gear train, mechanically coupled to the rotating frame, to rotate as the rotating frame moves;
    a stator assembly and a rotor assembly, coupled to each other, wherein the stator assembly comprises a coil, and the rotor assembly comprises a rotor and a third permanent magnet located on the rotor;
    a base; and
    a magnetic spring assembly comprising:
        a first permanent magnet, fixed onto the base, and
        a second permanent magnet, fixed onto the rotating frame mechanically coupled to the planetary gear train and the counter weight,
        wherein a polarity of the first permanent magnet is repulsive to a polarity of the second permanent magnet,
    wherein the rotor is mechanically coupled to the planetary gear train and receives the kinetic energy from the planetary gear train, to cause the third permanent magnet to rotate with the rotor, to change a magnetic flux of the coil to generate an induced electromotive force.

2. The apparatus according to claim 1, wherein a number of pairs of poles of the third permanent magnet is a multiple of a number of pairs of poles of the first permanent magnet, and
    the number of the pairs of poles of the third permanent magnet is a multiple of a number of pairs of poles of the second permanent magnet.

3. The apparatus according to claim 1, wherein the planetary gear train comprises:
    a ring gear, mechanically coupled to a cambered surface on a side of the rotating frame close to the rotor;
    a planetary gear, engaged with the ring gear; and
    a sun gear, engaged with the planetary gear and having a concentric shaft with the rotor.

4. The apparatus according to claim 1, wherein the rotating frame comprises:
    a rotating frame cylinder ring; and
    a rotating frame cylinder, bonded to the rotating frame cylinder ring seamlessly,
    wherein the rotating frame cylinder consists of two asymmetric parts, and there is at least one of a through hole or a recess in a first part of the two asymmetric parts,
    wherein a projection shape of the first part on a side of the rotating frame cylinder close to the rotor is semicircular.

5. The apparatus according to claim 4, wherein a weighting block is arranged in a second part of the two asymmetric parts of the rotating frame.

6. The apparatus according to claim 5, wherein the second part is located on a side of a first semicircular ring of the rotating frame cylinder ring close to the rotor, and the counter weight is located on a side of the first semicircular ring of the rotating frame cylinder ring away from the rotor.

7. The apparatus according to claim 1, wherein the counter weight is constituted by bonding a first partial cylinder ring and a second partial cylinder ring seamlessly, and mass of the second partial cylinder ring is greater than mass of the first partial cylinder ring.

8. The apparatus according to claim 7, wherein a first cambered surface of the first partial cylinder ring and a first cambered surface of the second partial cylinder ring are located on a given cambered surface, and a second cambered surface of the first partial cylinder ring is at least partially bonded to a cambered surface on a side of the rotating frame cylinder ring away from the rotor, and
    a side of the first partial cylinder ring away from the base is coplanar with a side of the rotating frame away from the base, and a side of the second partial cylinder ring away from the rotating frame is coplanar with a side of the base away from the rotating frame.

9. The apparatus according to claim 7, wherein projections of the first partial cylinder ring and the second partial cylinder ring on a plane on a side of the rotating frame away from the rotor are concentric, and central angles of the projections are identical, the central angles being less than 180°.

10. The apparatus according to claim 1, wherein the stator assembly further comprises a stator, and the coil is wound around a surface of the stator.

11. The apparatus according to claim 1, wherein the counter weight, the magnetic spring assembly, the planetary gear train, the rotor assembly, the stator assembly and the base are coaxially disposed.

12. The apparatus according to claim 1, wherein the base has at least one of a through hole or a recess, for placement of the coil.

13. The apparatus according to claim 1, wherein the rotor assembly is located between the planetary gear train and the base, and
    the stator assembly is located between the rotor assembly and the base.

14. A method for fabricating a kinetic energy collection apparatus, comprising:
    coupling a counter weight to a rotating frame mechanically, the counter weight being configured to oscillate with a movement of a wearing object, to convert a mechanical energy generated by the movement into a kinetic energy of the counter weight;
    coupling the rotating frame to a planetary gear train mechanically, to cause the planetary gear train to rotate as the rotating frame moves;
    disposing a stator assembly and a rotor assembly that are coupled to each other, wherein the stator assembly comprises a coil, and the rotor assembly comprises a rotor and a third permanent magnet located on the rotor, and
    fixing a first permanent magnet of a magnetic spring assembly onto a base, and fixing a second permanent magnet of the magnetic spring assembly onto the rotating frame coupled to the planetary gear train and the counter weight,
    wherein a polarity of the first permanent magnet is repulsive to a polarity of the second permanent magnet, to reduce a potential well depth of the counter weight, thereby enhancing the kinetic energy received by the rotating frame from the counter weight, wherein the rotor is mechanically coupled to the planetary gear train and receives the kinetic energy from the planetary gear train, to cause the third permanent magnet to rotate with the rotor, to change a magnetic flux of the coil to generate an induced electromotive force.

15. The method according to claim 14, further comprising:
    disposing a ring gear on a cambered surface on a side of the rotating frame close to the rotor;
    disposing a planetary gear in a semicircular structure formed by connecting the rotating frame and the counter weight, the planetary gear being engaged with the ring gear; and
    disposing a sun gear, engaged with the planetary gear and having a concentric shaft with the rotor.

16. The method according to claim 14, further comprising:
    forming at least one of a through hole or a recess in a first part of two asymmetric parts of a rotating frame cylinder consisting of the two asymmetric parts,
    wherein the rotating frame is constituted by bonding a rotating frame cylinder ring and the rotating frame cylinder seamlessly, and a projection shape of the first part on a side of the rotating frame cylinder close to the rotor is semicircular.

17. The method according to claim 16, further comprising:
    forming a weighting block in a second part of the two asymmetric parts of the rotating frame,
    wherein the second part is a part of the rotating frame cylinder other than the first part.

18. An electronic device, comprising a kinetic energy collection apparatus comprising:
    a counter weight, configured to oscillate with a movement of a wearer, to convert a mechanical energy generated by the movement into a kinetic energy of the counter weight;
    a rotating frame, mechanically coupled to the counter weight, and configured to receive the kinetic energy from the counter weight;
    a planetary gear train, mechanically coupled to the rotating frame, to rotate as the rotating frame moves;
    a stator assembly and a rotor assembly, coupled to each other, wherein the stator assembly comprises a coil, and the rotor assembly comprises a rotor and a third permanent magnet located on the rotor,
    a base; and
    a magnetic spring assembly comprising:
        a first permanent magnet, fixed onto the base, and
        a second permanent magnet, fixed onto the rotating frame mechanically coupled to the planetary gear train and the counter weight,
        wherein a polarity of the first permanent magnet is repulsive to a polarity of the second permanent magnet,
    wherein the rotor is mechanically coupled to the planetary gear train and receives the kinetic energy from the planetary gear train, to cause the third permanent magnet to rotate with the rotor, to change a magnetic flux of the coil to generate an induced electromotive force.

* * * * *